United States Patent [19]
Kotok et al.

[11] 3,974,479

[45] *Aug. 10, 1976

[54] MEMORY FOR USE IN A COMPUTER SYSTEM IN WHICH MEMORIES HAVE DIVERSE RETRIEVAL CHARACTERISTICS

[75] Inventors: Alan Kotok, Waltham; Allan R. Kent, Framingham; David A. Gross, Stow, all of Mass.

[73] Assignee: Digital Equipment Corporation, Maynard, Mass.

[ * ] Notice: The portion of the term of this patent subsequent to May 7, 1991, has been disclaimed.

[22] Filed: Apr. 5, 1974

[21] Appl. No.: 458,072

Related U.S. Application Data

[62] Division of Ser. No. 356,147, May 1, 1973, Pat. No. 3,810,110.

[52] U.S. Cl. ............................................ 340/172.5
[51] Int. Cl.² ........................................ G06F 13/00
[58] Field of Search ................................. 340/172.5

[56] References Cited
UNITED STATES PATENTS

| | | | |
|---|---|---|---|
| 3,333,251 | 7/1967 | Brenza et al. | 340/172.5 |
| 3,354,430 | 11/1967 | Zeitler et al. | 340/172.5 |
| 3,376,554 | 4/1968 | Kotok et al. | 340/172.5 |
| 3,418,638 | 12/1968 | Anderson et al. | 340/172.5 |
| 3,521,240 | 7/1970 | Bahrs et al. | 340/172.5 |
| 3,551,894 | 12/1970 | Lehman et al. | 340/172.5 |
| 3,810,110 | 5/1974 | Kotok et al. | 340/172.5 |

*Primary Examiner*—Gareth D. Shaw
*Assistant Examiner*—James D. Thomas
*Attorney, Agent, or Firm*—Cesari and McKenna

[57] ABSTRACT

A memory unit for use with a central processor unit in a data processing system. To retrieve data from the memory unit, the central processor unit energizes an appropriate one of several memory retrieval control signal conductors and memory address signal conductors to initiate a memory cycle during which the memory unit transmits an address acknowledgement signal and data signals back to the central processor unit. The memory unit has a characteristic retrieval interval during which the memory cycle is performed to retrieve data. Each memory retrieval control signal corresponds to a different category of characteristic retrieval interval. When the memory unit transmits the data signals, it transmits a data control signal which is delayed with respect to the address acknowledgement signal by a time interval that is directly related to the characteristic retrieval interval for the memory unit. If a memory unit has a certain characteristic retrieval interval, there also is included a circuit for transmitting a data warning signal a fixed time before the data control signal.

5 Claims, 5 Drawing Figures

MEMORY FOR USE IN A COMPUTER SYSTEM IN WHICH MEMORIES HAVE DIVERSE RETRIEVAL CHARACTERISTICS

CROSS REFERENCE TO A RELATED APPLICATION

This application is a division of co-pending application Ser. No. 356,147 filed May 1, 1973 entitled COMPUTER SYSTEM OVERLAP OF MEMORY OPERATION, now U.S. Pat. No. 3,810,110 issued May 7, 1974 and assigned to the same assignee as the present invention.

BACKGROUND OF THE INVENTION

1. Field of the Invention

This invention relates to a digital data processing system of the type having a plurality of memory units connected to a processing unit by means of a common bus. More particularly it relates to a multiple memory system in which the data retrieval operations of the memory units are overlapped so that retrieval in one memory unit can begin before a previous retrieval in another unit has been completed.

2. Prior Art

The present invention is an improvement on data processing systems of the type described in U.S. Pat. No. 3,376,554. One of these systems will typically have several memory units that store data received from one or more processors and, conversely, transmit stored data to the processors. The memories are connected to each processor unit by a common bus arrangement. When a processor it so perform a memory operation it transmits an address signal onto an address section of the bus and the memory containing the prescribed address responds by connecting itself to the bus and signalling the connection to the processor unit. Thereupon the processor unit transmits data over a data section of the bus if the operation is a write (store) operation or the memory unit transmits stored information if it is a read (retrieve) operation.

Normally, before a memory operation can be initiated, the previous memory operation must be completed, even though the two operations involve different memory units. This presents no problem with write operations because the memory units can be uniformly very fast in accepting data for storage. That is, even a slowly operating memory unit can temporarily store incoming data in a high speed register and then transfer the data into the designated memory address in subsequent internal operation. Thus the speed of this internal operation does not affect the time required for data transfer to the memory unit.

On the other hand, during a retrieval operation, data cannot be transmitted from a memory unit to the processor unit until the memory unit has retrieved the data from the designated address therein. Accordingly, the internal operating time of the memory does affect the overall time required for data retrieval. For a very fast memory unit, for example those using flip-flop registers as storage media, the read operation is very fast. However, when a slower memory is involved, the retrieval of stored data takes appreciable time. The required time may be further extended by the present day trend toward locating various units of the data processing system at significant distances from each other. The memory units may be located so far from associated processor units that the propagation time on the cable connecting the two units materially limits the system operating speed.

SUMMARY OF THE INVENTION

In an asynchronous data processing system of the type which this invention is concerned, when a processor unit initiates a data retrieval operation it transmits a memory address over the address section of the bus and the memory having that address returns an acknowledge signal to the processor unit. The memory unit then retrieves the data from the designated location in an internal storage register and transmits the data over the data section of the bus, along with a separate data signal indicating data transmission. On receipt of the data signal the processor unit takes in the data from the bus.

We reduce the retrieval time in multiple memory systems by overlapping the retrieval operations of all but the fastest memory units.

Assume, for the purpose of illustration, that the memory units in the system fall into three speed classifications. The first of these is "immediate". An immediate memory transmits information recorded therein almost as soon as it receives the address of the information. Normally the read access time, i.e. the total time for a retrieval operation is under 200 nsec. At present flip-flops are generally used as the storage media in immediate memories.

A "fast" memory unit is one which accomplishes the read operation fairly promptly, e.g. 600 nsec. after receipt of the address of the information to be retrieved. Finally a "slow" memory unit delivers data more slowly, e.g. 2.5 $\mu$ sec. after receipt of the address. In the embodiment of the invention described, the memories within each group need not have the same access time. However, the fast memories should all have access times shorter than the access time of any of the slow memories.

In addition to the address acknowledge and data signals, each of the fast and slow memory units provides a data warning pulse at a uniform time before the data signal. By way of example, the interval between the data warning pulse and the data signal may be 380 nsec.

With this arrangement the slow memory units are capable of essentially full overlap. That is, if a first read operation is initiated with a slow memory unit, a second read operation can be initiated in a second slow memory unit immediately after receipt of the address acknowledge signal from the first memory unit. In succession thereafter the processing unit will receive the data warning signal from the first memory unit, the data warning signal from the second memory unit, the data signal from the first memory unit and finally the data signal from the second memory unit.

Thus the signals from the two memory units arrive at the central processor in tandem in the order in which the memory units were addressed by the processor unit. As will be seen, this tandem receipt of the signals at the processor unit obtains even in the extreme case where the first memory unit is located at the far end of a long memory bus and the second memory unit is connected to the bus closely adjacent to the processor unit, a condition in which the transit time for signals between the processor unit and the first memory unit is much greater than the transit time for signals between the processor unit and the second memory unit.

Operation is the same if the first memory unit is a fast memory unit and the second is a slow memory unit. On the other hand, if data retrieval in a slow memory unit is followed by retrieval in a fast memory unit, initiation of the latter operation is delayed somewhat to insure that the ensuing data signals arrive at the processor unit in the right order. Specifically, the operation of the second memory unit is delayed until the data warning signal is received from the first unit. The system thus ensures that the data warning signals from the two memory units will arrive at the processor unit in the right order. Since the respective data signals follow the data warning signals by the same intervals, they too will arrive at the processor unit in the correct order along with the retrieved data from the two memory units.

Because of the relatively high speed of the immediate memory units, less is to be gained by overlapping their operation, either with each other or with the other memory units, and therefore, we prefer to avoid the additional circuit complexity required for their overlapping. However, in some applications it may be desirable to overlap the operation of these units also and this can be accomplished within the framework described in detail below. This invention is pointed out with particularity in the appended claims. A more thorough understanding of the various objects and advantages of this invention may be attained by referring to the following detailed description taken in conjunction with the accompanying drawings.

DESCRIPTION OF THE ILLUSTRATIVE EMBODIMENT

Figure 1:
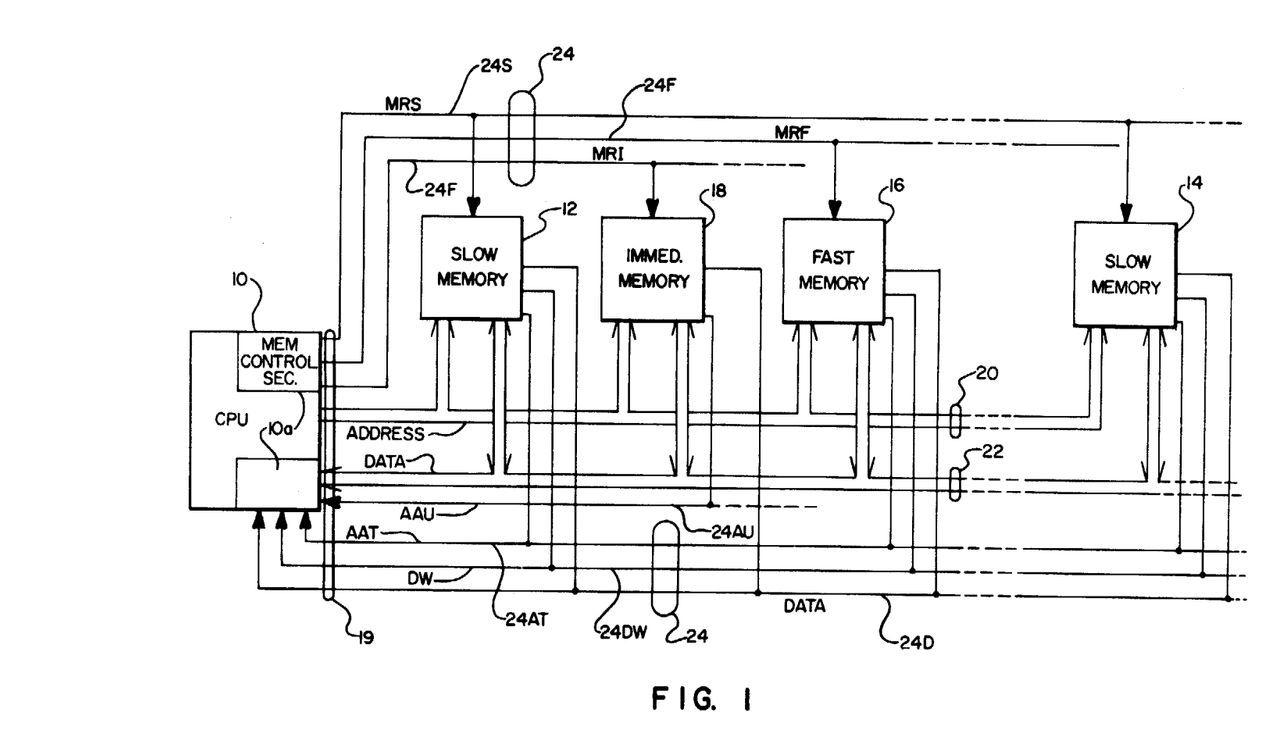
FIG. 1 is a simplified schematic diagram of a data processing system embodying the invention.

As shown in FIG. 1, a data processing system incorporating the invention includes a central processor unit 10, slow memory units 12 and 14, a fast memory unit 16 and an immediate memory unit 18. A memory bus 19 includes an address section 20 that conveys memory addresses from the processor unit 10 to the memory units 12–18. A data section 22 unit conveys data from the processor unit to a designated memory unit for storage therein during write operations and returns previously stored data from designated memory units to the processor unit during retrieval operations. A control section 24 conveys various timing and control signals between the processor unit 10 and the memory units 12–18.

Since the present invention relates to the retrieval operation, we have omitted from the drawings, for the sake of clarity, the various circuit elements and connections relating solely to the writing operations.

The basic concept of the invention can be conveniently comprehended by considering first the retrieval of data from the slow memory 12 of FIG. 1. For example, if the central processor unit 10 is to retrieve the data from the slow memory 12 it transmits over the address section 20 a memory address that is unique to the memory 12. The processor unit 10 also transmits over a wire 24s a memory retrieval (slow) signal (MRS) as shown in the timing sequence A of FIG. 4. The memory 12 responds to the combination of the MRS signal and the address on bus section 20. Specifically, addressable storage means in the memory 12 return an address acknowledge (timed) signal (AAT) to the processor unit 10, indicating receipt of the address. The processor unit thereupon drops the MRS signal and thereafter it may place on the address bus 20 the next memory address for data retrieval.

The memory 12 has now begun its internal process of retrieving the data stored in the designated address, commonly known as a memory cycle. In the specific example described herein it transmits back to the processor unit 10 a data warning signal (DW), over a wire 24dw, X nanoseconds after the AAT signal. The purpose of the DW signal will be explained below. Finally, the memory 12 places the retrieved data on the bus data section 22 and concurrently transmits a data signal on wire 24d, Y nanoseconds after the DW signal (Z nanoseconds after the AAT signal). The central processor unit 10 responds to the data signal by taking the data in from the bus 22.

If instead, the central processor unit 10 is to retrieve data from the slow memory 14, the signal sequence will be the same, except that the address transmitted over the address bus 20 will designate a location in the memory 14 and that memory will respond to the coincidence of the address with the MRS signal on the wire 24s. Moreover, since the memory 14 is located substantially farther away from the central processor unit 10 than the memory 12, it will take a substantially longer time for the MRS signal to reach the memory 14 and for the responsive AAT signal to return to the processor unit 10 than the corresponding intervals for the memory 12. This is shown in the timing series B in FIG. 4 as a resultant lengthening of the duration of the MRS signal.

Figure 3A:
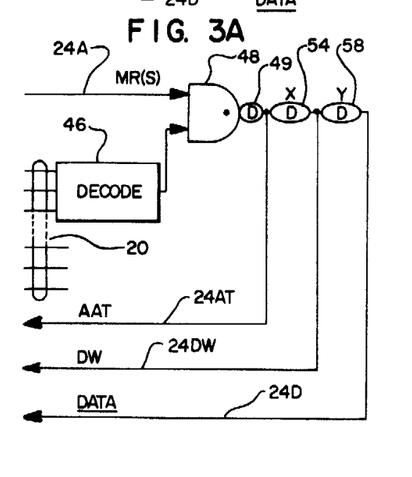
FIG. 3A is a schematic diagram of the signalling section of a slow or fast memory unit in the data processing system.
Figure 3B:
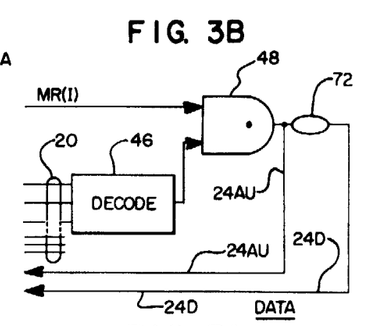
FIG. 3B is a schematic diagram of the signalling section of an immediate memory.

However, the relative timing of the generation of the AAT signal, the DW signal and the data signal is the same as for the memory 14 as for the memory 12. It follows that these three signals are received at the central processor unit 10 with the same relative timing. That is, no matter how near or how remote from the processor unit 10 a slow memory is located, the processor unit 10 receives the data signal from that memory Z nanoseconds after the AAT signal from that memory and receives the data warning signal Y nanoseconds before the data signal. Thus, in FIG. 3 the illustrated timing of the various signals is as of their generation in, or arrival at, the processor unit 10.

Next assume that the central processor unit is to retrieve data from an address in the slow memory 12 and then from an address in the slow memory 14. The system will generate signals as in the sequence C of FIG. 4. Thus an MRS-12 signal on the wire 24s, terminated by an AAT-12 signal returned to the processor unit 10 by the slow memory 12. The memory 12 having thus indicated receipt of the address of the data it is to send to the processor unit 10, the processor unit can then place on the address bus 20 the address of the data to be retrieved from the memory 14. The processor unit transmits the address concurrently with an MRS-14 signal which is subsequently terminated by the reception of an AAT-14 signal from the memory 14.

Figure 4:
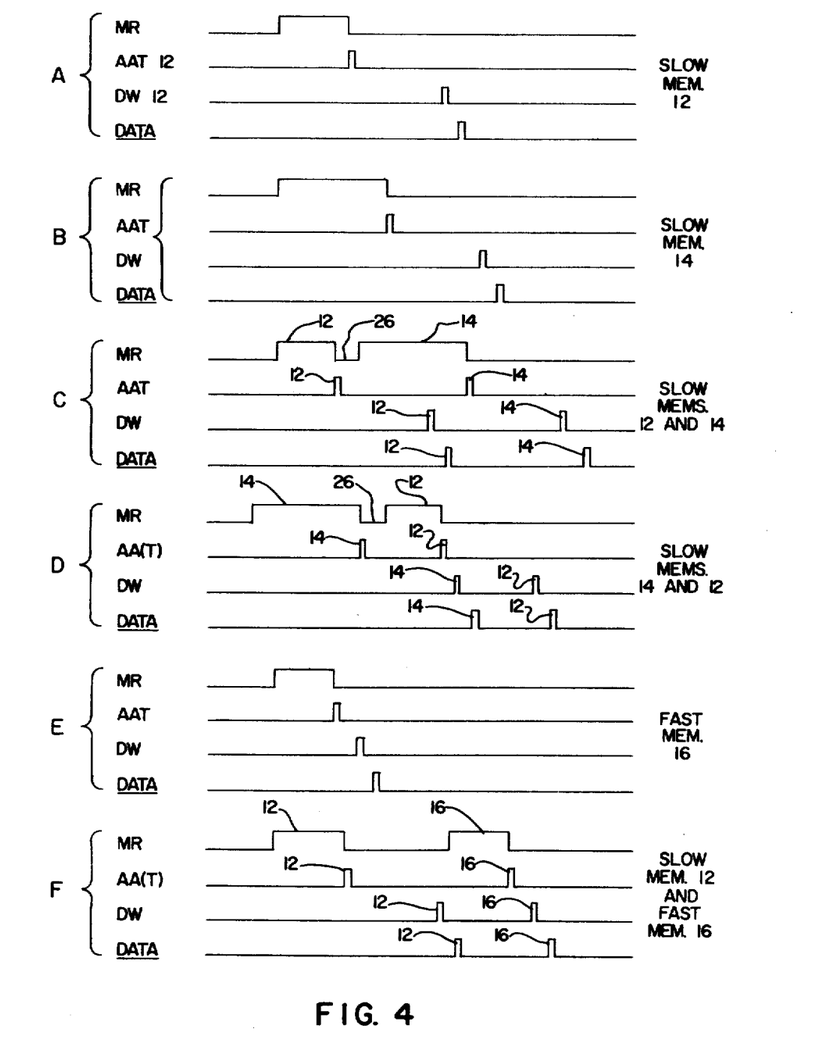
FIG. 4 is a series of timing diagrams showing the relationships between certain signals in the system.

Next, X nanoseconds after receiving the AAT-12, signal the processor unit 10 receives a DW-12 signal from the memory 12, followed by the data-12 signal from the same memory. The latter signal indicates that the data from the memory 12 is present at the processor end of the bus data section 22 and the processor thereupon loads an internal register (not shown) with that data.

Shortly thereafter the processor unit receives a DW-14 signal from the memory 14, followed by the data-14 signal. It thereupon takes in the corresponding data from the memory 14. Since the data retrieved from the memories 12 and 14 has arrived at the processor unit 10 in the same order as the corresponding MRS signals were sent out from the processor unit, the latter unit can readily associate the incoming data with the addresses from which they are retrieved.

Next assume that the processor unit 10 is to retrieve data from the more distant slow memory 14 first and then from the memory 12. The system will follow the signal sequence D of FIG. 4. This sequence is similar to the sequence C except for a reversal of the order of the corresponding signals involving the two memories. Thus the MRS-14 signal precedes the MRS-12 signal and consequently, the AAT-14 signal arrives at the processor unit 10 before the AAT-12 signal. In turn, because of the fixed timing between the two AAT signals and the corresponding data signals, the data-14 signal arrives at the processor unit 10 before the data-12 signal.

Thus, again the data from each memory arrives at the processor unit in the order in which the memory addresses were transmitted from the unit 10. Moreover, this order will be the same regardless of the relative distances of the slow memories 12 and 14. If the memory 14 is farther away, the only difference in the timing sequence D will be a lengthening of the MRS-14 signal and a consequent shifting to the right of all the remaining signals, without any change in their timing relative to each other.

In essence by initiating the cycle of the memory 12 upon the processor unit's receipt of the AAT-14 signal from the memory 14, we have made the time at the processor unit the reference for the timing of all succeeding signals. Thus so long as the AAT signal from one memory is received before the AAT signal from another memory, the data from the first memory will be received by the processor unit before the data from the second memory.

As seen in the sequence D of FIG. 4, the interval between each of the signals from the first memory (14) and the corresponding signal from the second memory (12) is a function of the length of the MRS signal for the second memory. The length of the MRS-12 signal is a function of the distance between the memory 12 and the processor unit 10. Thus if the memory 12 is positioned directly adjacent to the processor unit, the MRS-12 signal may have a neglible duration. Therefore, to ensure enough separation of the signals from the two memories so that the processor unit 10 can distinguish between them, the processor unit 10 is provided with circuitry (not shown) that imparts a delay between the termination of each MR signal and the beginning of the next MR signal, as shown at 26 in sequences C and D of FIG. 4. This delay is the minimum separation between the corresponding signals arriving at the central processor unit 10 from successive memories.

When data is to be retrieved from the fast memory 16 of FIG. 1, the signal sequence (FIG. 4E) is similar to the sequence for a slow memory. Thus the central processor unit 10 transmits an MRF signal on wire 24f, along with a memory address that identifies a location in the memory 16. The memory 16 responds to the combination of these signals by returning an AAT signal on the wire 24at. Next the memory 16 sends back a DW signal followed, Y nanoseconds later, by a data signal on wire 24d and transmission of the contents of the designated memory location on the bus data section 22.

As seen in FIG. 4E, the interval between the AAT signal and the DW signal is considerably shorter for the fast memory 16 than the corresponding X-nanosecond interval of the slow memories 12 and 14 (sequences A and B). This is because the fast memory is able to perform its internal data retrieval operation substantially faster than the slow memory. In the present system, we take advantage of this faster operation by shortening the time between the AAT and the DW signals, while the interval between the DW and data signals is maintained at the same duration as for the slow memories. The reason for this arrangement will be readily understood from a description of overlapping operation of fast and slow memories.

More specifically, suppose that the central processor unit 10 is to retrieve data first from the slow memory 12 and then from the fast memory 16. A comparison of signal sequences A and E shows that if the operations of the two memories were overlapped in the same manner as they are for the overlapping of two slow memories, the DW-16 signal from the fast memory 16 would arrive at the processor unit 10 before the DW-12 signal from the slow memory 12. This is because the DW-16 signal follows the AAT-16 signal by a W-nanosecond interval that is very short compared with the X-nanosecond interval for the DW-12 signal. Accordingly, the data-16 signal, which follows the DW-16 signal by the standard Y-nanosecond interval would arrive at the central processor unit before the data-12 signal. The central processor unit would thus receive the retrieved data from the memories 12 and 16 in the reverse order.

On the other hand, consider the signal sequence when the processor unit 10 is to retrieve data first from the slow memory 12 and then from the fast memory 16, but with the fast memory 16 located at a substantially greater distance from the processor unit 10 than the slow memory 12. The MRS-16 signal would then have a considerably longer duration, that is, the AAT-16 signal would be substantially delayed with respect to the timing shown in the sequence E. This would result in a corresponding delay in the DW-16 and data-16 signals so that they would occur after the corresponding signals for the slow memory 12. In that case the processor unit would receive the data from the two memories in the same order as it requested them. Obviously then this overlapping arrangement could result in a mixup of the retrieved data.

Accordingly, we arrange the system to operate as in sequence F of FIG. 4 when data is to be retrieved first from a slow memory and then from a fast memory. For example, when the memories 12 and 16 of FIG. 1 are involved, the first control signal is the MRS-12 signal, which is transmitted by the central processor unit 10, along with an address on the bus section 20 designating a location in the memory 12. As described above, the MRS-12 signal is terminated by the receipt of an AAT-12 signal.

However, in a departure from the overlapped operation of a pair of slow memories, the central processor unit 10 does not immediately issue the MRF-16 signal. Rather this signal is initiated by the receipt of the DW-12 signal from the memory 12. Thereafter the signal sequence at the processor unit 10 is data-12, followed by AAT-16, which terminates the MRF-16 signal. The processor unit 10 then receives the DW-16 signal, followed finally by the data-16 signal. Data from the memories 12 and 16 is thus received by the processor unit 10 in the correct order.

Moreover the correct order will be maintained regardless of the relative distances of the memories 12 and 16 from the central processor unit 10. This is because the signals involving the fast memory 16 are forced to follow the DW-12 signal from the slow memory 12 and, in particular, the DW-16 signal must follow the DW-12 signal. Since the data-12 an data-16 signals follow the respective DW-12 and DW-16 signals by the same Y-nanosecond interval, the data signals and the corresponding retrieved data must arrive at the central processor unit 10 in the same order as the DW signals.

The sequence F of FIG. 4 also represents the overlapped operation of two fast memories, although with a shorter time scale. That is, when data is to be retrieved from a first fast memory and then from a second fast memory, the MRF signal for the second memory is initiated by receipt of the DW signal from the first memory, thereby insuring that the DW signals from the two memories and thus the corresponding data signals are received by the central processor unit in the correct order. This takes care of any problems that might otherwise be caused by the relative distances of the two memories from the central processor unit. It also eliminates any problems that would otherwise be caused by differences in the speeds of the two fast memories, since a speed difference has the same effect as a difference in the distances of the memories from the processor unit 10.

To maximize overall speed of operation when fast memories are involved the Y-nanosecond interval between the DW and data signals should correspond approximately to the full data retrieval interval of the fastest of the fast memories. More specifically, in the fastest fast memory, the DW signal should follow immediately after the AAT signal.

The immediate memories such as the memory 18 have such a short data retrieval time that little is to be gained by overlapping their operation with that of the slow and fast memories. Therefore, to minimize circuit complexities, we prefer to prevent initiation of retrieval from an immediate memory, i.e. transmission of an MRI signal, until the data signals from all previously interrogated memories have been received by the central processor unit 10.

Figure 2:
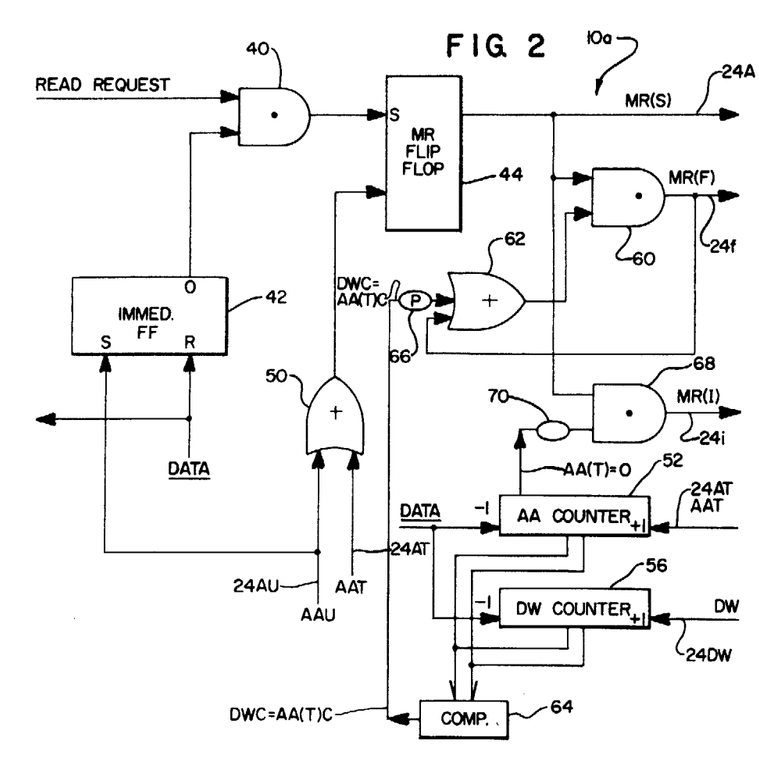
FIG. 2 is a schematic diagram of the memory retrieval control section incorporated in the processor unit of FIG. 1.

FIGS. 2 and 3A and 3B are diagrams of circuits that generate and respond to the various control signals discussed above. FIG. 2 shows the memory retrieval control section 10a in the central processor unit 10 of FIG. 1. The circuit of FIG. 3A is the signal generating section in each of the slow and fast memories. Except for these circuits the central processor unit and memories may be of the types described in U.S. Pat. No. 3,376,554.

When the central processor unit decodes an instruction calling for retrieval from one of the memories it provides a read request signal along with a set of address signals indicating the location of the information to be retrieved. The address signals are placed on the bus address section 20 (FIGS. 1 and 3) as described above, while the read request signal is applied to an AND gate 40 (FIG. 2) enabled by the reset condition of an immediate flip-flop 42. The resulting output of the gate 40 sets an MR flip-flop 44 whose MRS output is transmitted over the conductor 24s.

As shown in FIG. 3A, each of the memories includes a decoder 46 that receives the signal on certain of the wires in the bus section 20. These signals identify the particular memory containing the designated memory address. In the identified memory, the decoder 46 applies an input signal to an AND gate 48 and the coincidence of that input with the MRS signal provides an output from the gate 48. The leading edge of this output signal triggers a one-shot that serves as a delay element 49. On returning to its stable state the element 49 emits a pulse that is returned to the central processor unit on the conductor 24at as the AAT signal. As shown in FIG. 2, the AAT signal passes through an OR circuit 50 to reset the MR flip-flop 44 and thereby terminate the MRS signal. Each AAT signal is also counted by an AAT counter 52.

The AAT signal from the delay element 49 (FIG. 3A) is also passed to a second delay element 54. After an interval of X nanoseconds, the element 54 emits a pulse that serves as the DW signal on the conductor 24dw. When the DW signal arrives at the central processor unit 10 (FIG. 3), it is counted by a DW counter 56.

As shown further in FIG. 3A, the DW pulse in the slow memory is applied to a third delay element 58 which, after an interval of Y nanoseconds, emits the data signal over the wire 24d. At the central processor unit 10 this signal is applied to both the AAT counter 52 and DW counter 56 to reduce by one the content of each counter.

In our system the overlapping of slow memories is based on a uniform interval between the AAT and data signals. Accordingly, if the slow memories have different access times, i.e. different retrieval speeds, the difference is incorporated into the interval between receipt of the memory address and MRS signal by a slow memory and transmission of the subsequent AAT signal from that memory. Thus, the delay element 49 of FIG. 3A compensates for the different access times of the slow memories. If the slow memories all have the same access time, the delay element 49 can, of course, be eliminated.

If the memory identified by the processor unit is a fast memory, the control signal arrangement within the memory is the same as shown in FIG. 3A, except that the AND gate 48 is then connected to the control wire 24f so as to receive only MRF signals, and the delay element 49 is eliminated. Also the delay element 54 will then provide a delay of less than X nanoseconds. However, the generation of the MRF signal by the memory control section 10A (FIG. 2) is different from the generation of the MRS signal.

More specifically, the MRF signal is applied to the control wire 24f by an AND gate 60 upon the coincidence of the MRS signal with an output from an OR circuit 62. One input for the OR circuit is provided by a comparator 64 whenever the contents of the counters 52 and 56 are equal. Equality of the counter contents means that, for every AAT signal from a slow or fast memory, there has been a subsequent DW signal. As pointed out above, this is the condition for transmission of an MRF signal from the memory control section. The output of the comparator 64 is delayed somewhat by a delay element 66 to provide a delay of the MRF signal analogous to the delay 26 between consecutive MRS signals.

The other input for the OR circuit 62 is the MRF signal itself. This provides a latch that insures continuation of the signal until it is terminated by resetting of the flip-flop 44 upon receipt of the corresponding AAT signal. It thus ensures continuation of the MRF signal in spite of any noise in comparator 64 output that might otherwise cause a premature termination of this signal.

As noted above, the immediate memories are sufficiently fast that there is little to be gained by overlapping their operation. Therefore, they are preferably left out of the overlapping operations involving the slow and fast memories. Thus the MRI signal that initiates the retrieval operation in immediate memories is generated by an AND gate 68 upon the coincidence of the MRS signal and a zero count in the AAT counter 52. The signal from the counter 52 is delayed by a delay element 70 that serves the same function as the delay element 66.

As shown in FIG. 3B the coincidence of the MRI signal with an address in the selected immediate memory provides an output from an AND gate 48 that is returned on the wire 24au address acknowledge (untimed) (AAU) signal. At the memory control section 10A (FIG. 2) this AAU signal resets the MR flip-flop 44 by way of the OR circuit 50. It also sets the immediate flip-flop 42 to disable the AND gate 40. This prevents the generation of further MR signals. whether they be for slow, fast or immediate memories.

Returning to FIG. 3B, the output of the AND gate 48 is delayed by a delay element 72 for an interval corresponding to the retrieval time of the immediate memory and then returned as a data signal on the wire 24d. As with the slow and fast memories the data signal causes the central processor unit 10 to accept the retrieved data from the bus data section 22 (FIG. 1). Also, as shown in FIG. 2, it resets the immediate flip-flop 42, thereby enabling the AND gate 40 and permitting the generation of further MR signals and initiation of corresponding data retrieval operations.

Another feature of our system is the lack of any requirement that the central processor unit 10 "know" whether any particular memory is slow, fast or immediate. The processor unit generates memory addresses that are unique to the respective memories, but these addresses in themselves contain no indication of memory access speed. The processor also transmits the MRS, MRF and MRI signals to which the memories respond as described above. However, these are timing signals that are generated in response to various conditions relating to when memories of the corresponding types can be permitted to begin their retrieval operations. Specifically, transmission of the MRS, MRF and MRI signals does not depend on the type of memory which is presently being addressed. Rather it depends on the status of previously initiated memory retrieval operations and on the types of memories involved in the latter operations. For example, when data is to be retrieved from a slow memory, with all previously initiated memory retrieval operations having been completed, the memory control section 10a will transmit both the MRF and MRI signals in addition to the required MRS signal. Moreover, an MRS. signal is transmitted whenever an MRF or MRI signal is transmitted, and an MRF signal is transmitted whenever an MRI signal is transmitted. This creates no problem, because only the memory containing the designated address on bus section 20 can respond to a retrieval request.

Thus the classification of each memory is, in essence, recorded only in the memory itself by virtue of its connection to one of the wires 24s, 24f or 24i so that the memory will receive the appropriate one of the MRS, MRF and MRI signals. When the central processor unit 10 transmits a memory address over the bus section 20, the memory containing the designated location initiates its internal retrieval process only when it has received the appropriate MR signal. This forces operation of the memory in the timing relationship described above.

From the foregoing it will be apparent that our memory retrieval time, the amount of time saved being progressively greater for memories having longer data retrieval cycles. The time saving is obtained without undue complication of the system and indeed relatively simple additional circuitry in the central processor unit and the memories provides the features of this invention.

It will also be apparent that one may make various modifications in the system without departing from the scope of the invention. For example, various circuit elements may be eliminated in a system that has only slow and fast memories or slow and immediate memories. As another example, the system might be expanded to memories falling into four general speed categories by adding another signal having a function similar to that of the data warning signal and used as a condition for initiation of retrieval from the second fastest memory category.

We claim:

1. A memory unit for connection to a data processing system, the system including a central processor unit and a bus for connecting said memory unit to the central processor unit, the central processor unit including means for transmitting memory address signals and a memory retrieval control signal onto corresponding conductors in the bus for transfer to said memory unit thereby to cause said memory unit to transmit an address acknowledgement signal and data signals onto other corresponding conductors in the bus to the central processor unit, said memory unit comprising:
   A. addressable storage means for transmitting the data signals onto the bus for transfer to the central processor unit, said addressable storage means including a plurality of addressable storage locations for storing data,
   B. address decoder means for transmitting an enabling signal when the memory address signals on the bus from the central processor unit identify one of said addressable storage locations in said memory unit,
   C. coincidence means responsive to the coincidence of the memory retrieval control signal on the bus from the central processor unit and the enabling signal from said address decoder for transmitting the address acknowledgement signal onto the bus for transfer to the central processor unit and for causing said addressable storage means to initiate a memory cycle during which said addressable storage means retrieves data from that storage location identified by the memory address signals and couples the corresponding data signals onto the bus, and D. data warning means coupled to said coincidence means for transmitting over the bus to the central processor unit during each memory cycle a data warning signal a predetermined interval before said addressable storage means transmits the data signals.

2. A memory unit as recited in claim 1 wherein said memory unit has a characteristic retrieval interval during which said addressable storage means performs a memory cycle and wherein the data processing system includes at least one other memory unit connected to the bus that has its own characteristic retrieval interval; said memory unit additionally including means coupled to said coincidence means for transmitting to the central processor unit over the bus a data control signal a second predetermined time interval after the transmission of the address acknowledgement signal by said coincidence means and concurrently with the transmission of the data signals by said addressable storage means, the second predetermined time interval being dependent upon the characteristic retrieval interval for said memory unit, said data warning signal means transmitting the data warning signal a fixed time interval before the transmission of the data control signal, the fixed time interval for said memory unit being independent of the characteristic retrieval interval and essentially the same as the corresponding fixed time interval for other memory units notwithstanding their characteristic retrieval intervals thereby to enable said memory unit to operate compatibly with the at least other memory units connected to the bus that have diverse characteristic retrieval intervals.

3. A memory unit as recited in claim 1 wherein said memory unit has a characteristic retrieval interval during which said addressable storage means performs a memory cycle and wherein the data processing system to which it connects includes at least one other memory unit having its own characteristic retrieval interval, said memory unit additionally including means coupled to said coincidence means for transmitting to the central processor unit over the bus a data control signal a second predetermined time interval after the transmission of the address acknowledgement signal by said coincidence means and concurrently with the transmission of the data signals from said addressable storage means, the second predetermined time interval being directly related to the characteristic retrieval interval for said memory unit, said data warning means transmitting the data warning signal a fixed time interval before the transmission of the data control signal, the fixed time interval for said memory unit being independent of the characteristic retrieval interval and essentially the same as the corresponding fixed time interval for the other memory units notwithstanding their characteristic retrieval intervals thereby to enable said memory unit to operate compatibly with the at least one other memory units connected to the bus that have diverse characteristic retrieval intervals.

4. A memory unit for connection to a data processing system including a central processor unit, at least one other memory unit and a bus for interconnecting the central processor unit, said memory unit and the at least one other memory unit, the central processor unit including means for transmitting to the memory units memory address signals and a plurality of memory retrieval control signal onto corresponding conductors in the bus, each memory retrieval control signal conductor corresponding to a different memory category representing different characteristic retrieval intervals for the memory units adapted for connection to the bus, said memory unit comprising:

A. addressable storage means for transmitting data signals onto other corresponding conductors in the bus for transfer to the central processor unit, said addressable storage means including a plurality of addressable storage locations and the data signals corresponding to data retrieved from one of said addressable storage locations during a memory cycle, the interval required to perform the memory cycle being the characteristic retrieval interval for said memory unit, B. selection means for receiving all the plurality of memory retrieval control signals transmitted by the central processor unit, said selection means coupling therethrough as a selected memory retrieval control signal only those memory retrieval control signals that correspond to the characteristic retrieval interval for said memory unit, C. address decoder means for transmitting an enabling signal when the memory address signals on the bus identify one of said addressable storage locations in said memory unit, and D. coincidence means responsive to the coincidence of the selected memory retrieval control signal and the enabling signal for transmitting an address acknowledgement signal onto another corresponding conductor in the bus for transfer to the central processor unit and for causing said addressable storage means to initiate a memory cycle.

5. A memory unit as recited in claim 4 additionally comprising means coupled to said coincidence means for transmitting over the bus to the central processor unit during each memory cycle a data warning signal onto another corresponding conductor in the bus before the data is transmitted by said addressable storage means.

* * * * *

UNITED STATES PATENT OFFICE
CERTIFICATE OF CORRECTION

Patent No. 3,974,479        Dated August 10, 1976

Inventor(s) Alan Kotok et al.

It is certified that error appears in the above-identified patent and that said Letters Patent are hereby corrected as shown below:

Column 1, line 33, "it so" should read -- is to --.

Column 5, line 58, "neglible" should read -- negligible --.

Column 11, line 22, "data warning signal means" should read -- data warning means --.

Signed and Sealed this

Thirty-first Day of May 1977

[SEAL]

Attest:

RUTH C. MASON
*Attesting Officer*

C. MARSHALL DANN
*Commissioner of Patents and Trademarks*